United States Patent [19]

Kremidas et al.

[11] Patent Number: 5,224,384
[45] Date of Patent: Jul. 6, 1993

[54] RESISTIVE STRAIN GAUGE PRESSURE SENSOR

[75] Inventors: James R. Kremidas, Fenton, Mich.; Boris Kamentser, Fountain Valley, Calif.

[73] Assignee: MacLean-Fogg Company, Mundelem, Ill.

[21] Appl. No.: 741,075

[22] Filed: Aug. 6, 1991

Related U.S. Application Data

[63] Continuation-in-part of Ser. No. 711,947, Jun. 7, 1991, Pat. No. 5,174,158.

[51] Int. Cl.⁵ .......................... G01L 7/08; G01L 9/06
[52] U.S. Cl. ........................................ 73/721; 73/708; 73/727; 73/756; 338/4
[58] Field of Search ............... 73/708, 720, 721, 754, 73/706, 720, 721, 753, DIG. 1, 756, 727; 338/4

[56] References Cited

U.S. PATENT DOCUMENTS

| | | | |
|---|---|---|---|
| 3,505,634 | 11/1967 | Von Vick | 338/4 |
| 3,748,571 | 7/1973 | Kurtz | 323/74 |
| 4,295,376 | 10/1981 | Bell | 73/724 |
| 4,311,980 | 1/1982 | Prudenziati | 338/4 |

FOREIGN PATENT DOCUMENTS 0960559 9/1982 U.S.S.R. ............................ 73/720

OTHER PUBLICATIONS

Pp. 425-438 "Measuring Systems Application and Design" Ernest Doebelim, 3rd Edition, McGraw Hill.
Pp. 422-436 "Measuring Systems Application and Design" Ernest Doebelim, 3rd Edition, McGraw Hill.
Atsugi Unisia Corporation Brochure (2 pages).
IBM Technical Disclosure Bulletin (1 page).

Primary Examiner—Donald O. Wood
Attorney, Agent, or Firm—Krass & Young

[57] ABSTRACT

A resistive strain gauge pressure sensor including upper and lower housings coacting to define a pressure chamber within the housing. A board member is clamped between the housings and defines a diaphragm portion which extends across the pressure chamber to divide the pressure chamber into upper and lower chamber portions. All of the circuitry of the sensor is screen printed onto the lower planar face of the board member including the various resistor elements of the strain gauge assembly, the various elements of the conditioning circuit receiving the output of the strain gauge assembly, and the various further leads required to connect the circuitry elements to the terminals of the sensor. The sensor terminals are provided by a plurality of connector pins extending downwardly through the board member for connection at their respective lower ends to the circuitry provided on the lower face of the board member.

7 Claims, 7 Drawing Sheets

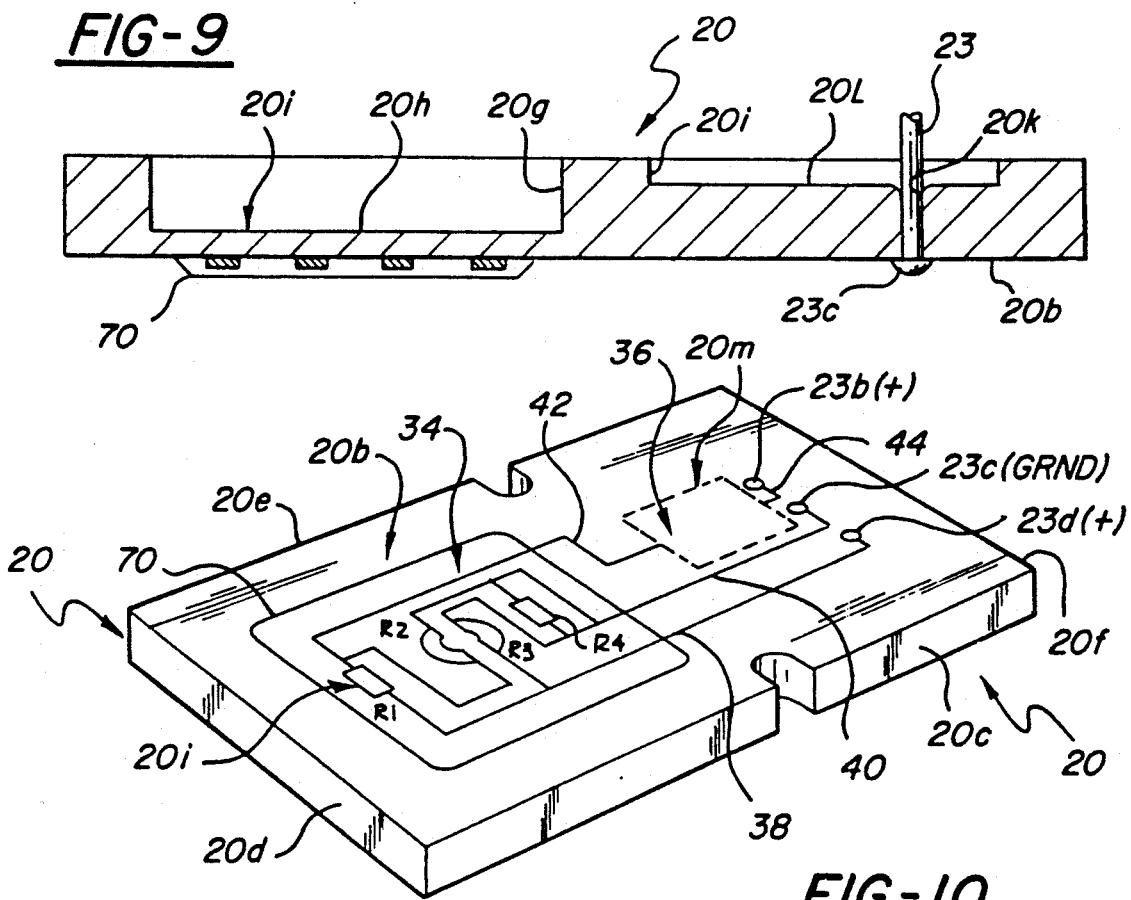
FIG-9
FIG-10
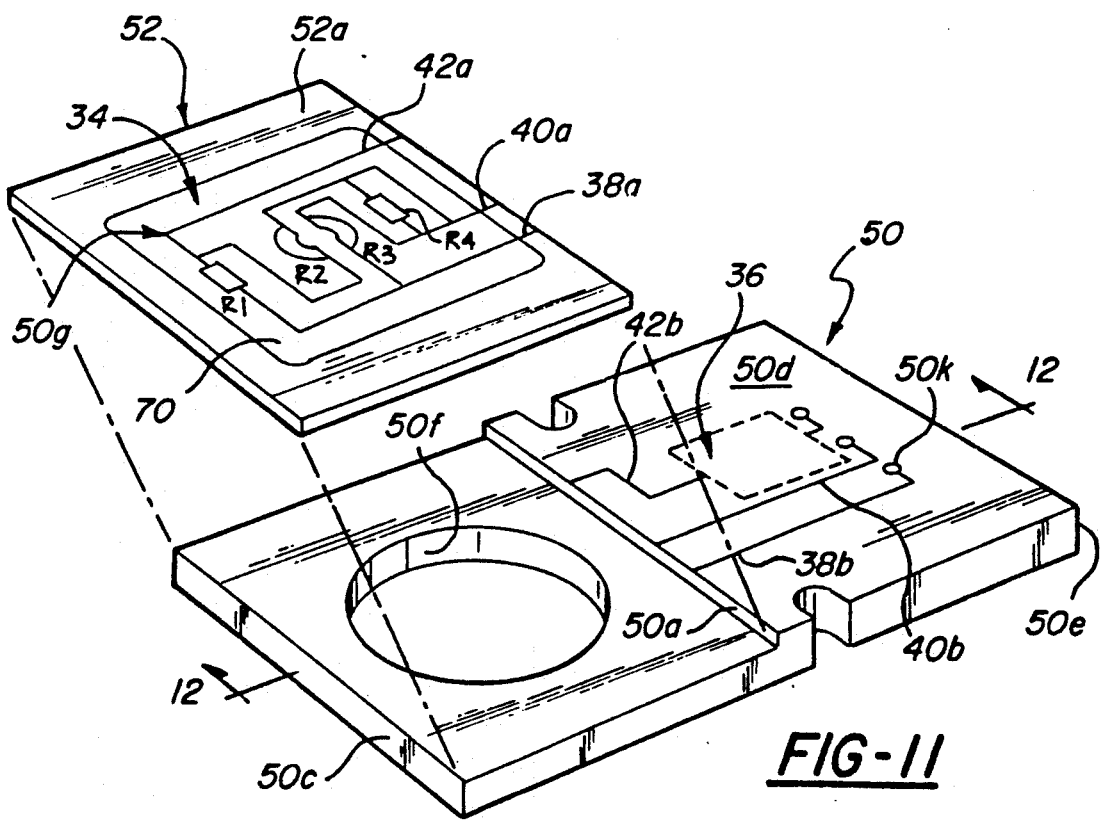
FIG-11

RESISTIVE STRAIN GAUGE PRESSURE SENSOR

RELATED APPLICATION

This application is a continuation-in-part of U.S. patent application Ser. No. 711,947 filed on Jun. 7, 1991, now U.S. Pat. No. 5,174,158.

BACKGROUND OF THE INVENTION

This invention relates to pressure transducers and more particularly to resistive strain gauge pressure sensors.

It is often necessary to determine the pressure of gases and liquids for purposes of measurement or control and many transducers and sensors have been proposed to facilitate the determination of the pressure of gases and liquids. One general type of transducer or sensor for such applications is a resistive strain gauge sensor in which the pressure is sensed and measured based on dimensional changes in strain gauges which generate proportional changes in the resistance of the gauge.

Whereas many types of resistive strain gauge pressure sensors have been designed and made commercially available, and whereas the various resistive strain gauge sensors have proven to be generally satisfactory, these gauges tend to be rather expensive both in terms of labor and material. Specifically, the design of prior art resistive strain gauge sensors has required complicated wire circuitry, typically including a multitude of solder joints, and this complex circuitry and multiplicity of solder joints have added to the complexity and cost of the sensors.

SUMMARY OF THE INVENTION

This invention is directed to the provision of a resistive strain gauge pressure sensor having a simple, inexpensive, and effective design.

More specifically, this invention is directed to the provision of a resistive strain gauge pressure sensor embodying simplified circuitry.

The invention pressure sensor is of the type including a housing defining a chamber; a board member including a diaphragm portion extending across the chamber; a strain gauge circuit assembly on one face of the board member; and electrical connector means for the sensor. According to the invention, the electrical connector means extend from a location accessible from the exterior of the housing and through the board member for connection with the strain gauge circuit assembly. This arrangement simplifies the transmittal of power to and from the strain gauge circuit assembly.

According to a further feature of the invention, the connector means comprises a plurality of pin members extending through the board member to define terminal means at their terminal ends for connection with the circuit. This specific arrangement further simplifies the transmittal of power to and from the strain gauge circuit assembly.

According to a further feature of the invention, the housing includes an upwardly opening socket, the strain gauge circuit assembly is provided on a lower face of the board member, and the pins are positioned at their upper ends in the socket and extend downwardly for passage at their lower ends through the board member so as to define the terminal means at their lower ends. This specific arrangement still further simplifies and optimizes the transmittal of power to and from the strain gauge circuit assembly.

BRIEF DESCRIPTION OF THE DRAWINGS

FIG. 9 is a cross-sectional view taken on line 9—9 of FIG. 8;

FIG. 10 is a perspective view showing the bottom of the board member;

FIG. 11 is a perspective exploded view of a modified form of the invention board member;

DETAILED DESCRIPTION OF THE PREFERRED EMBODIMENTS

Figure 1:
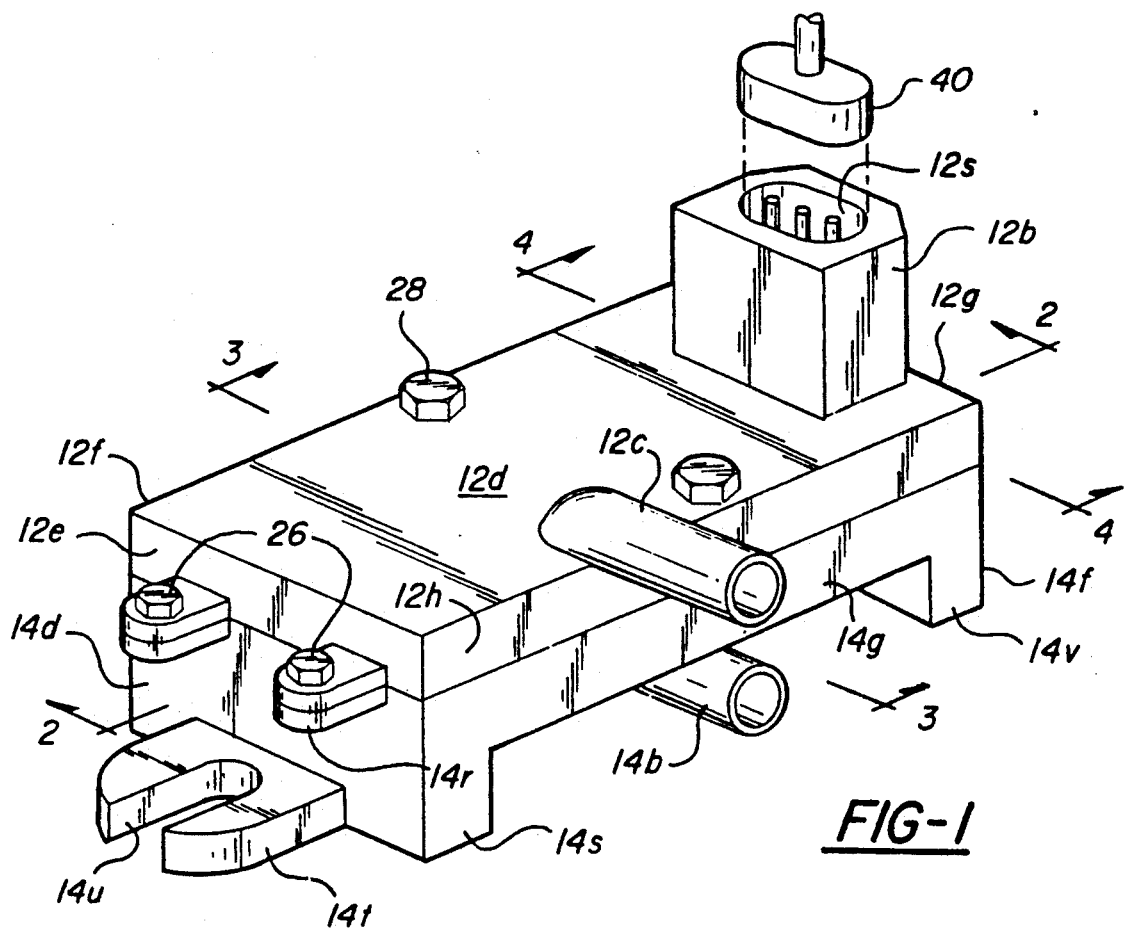
FIG. 1 is a perspective view of a sensor according to the invention.
Figure 2:
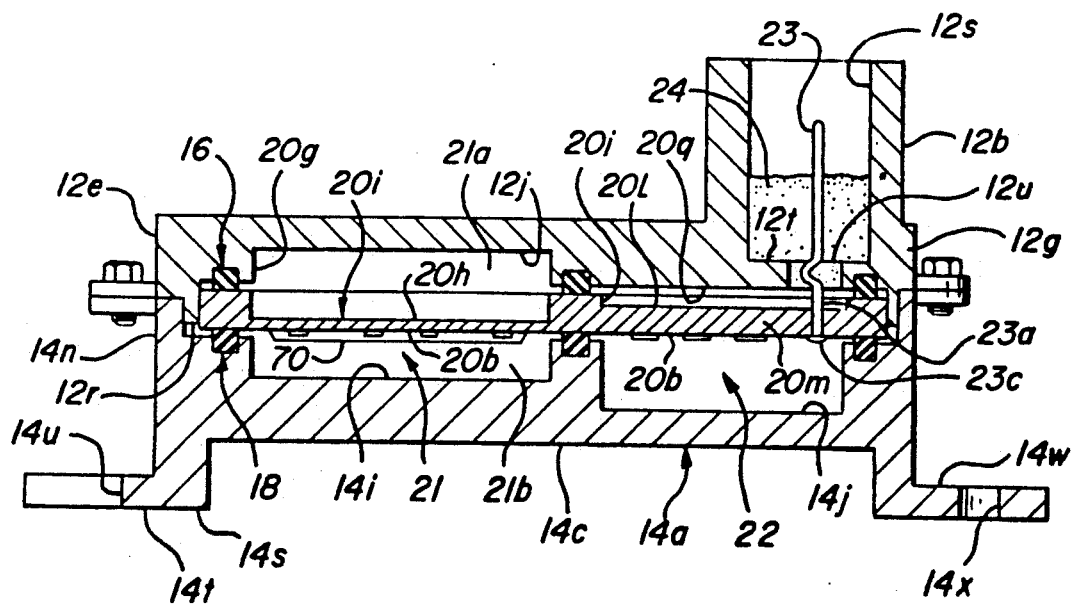
FIGS. 2, 3, and 4 are cross-sectional views taken respectively on lines 2—2, 3—3 and 4—4 of FIG. 1.
Figure 3:
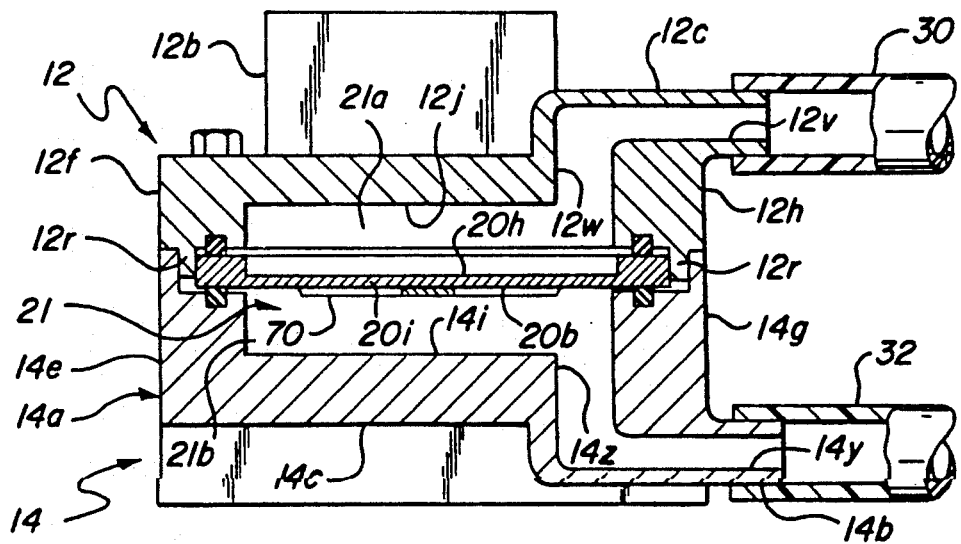
Figure 4:
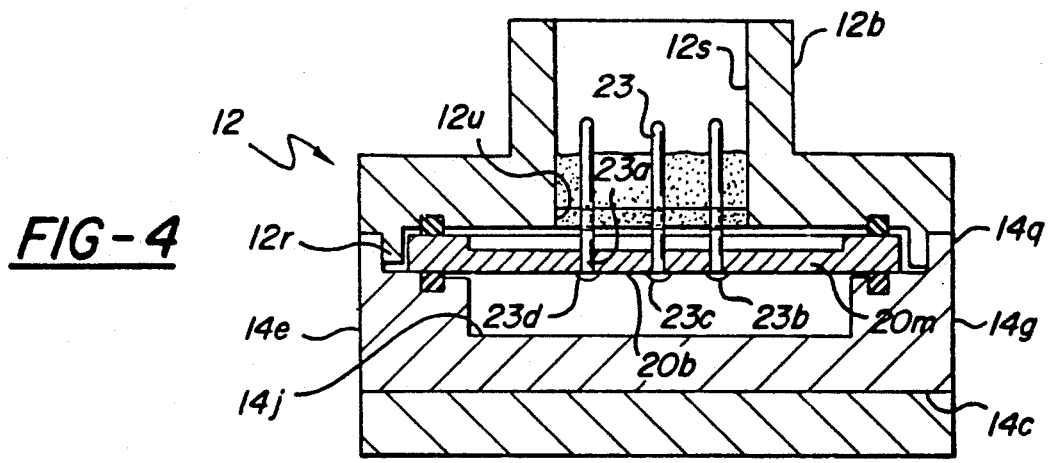
Figure 6:
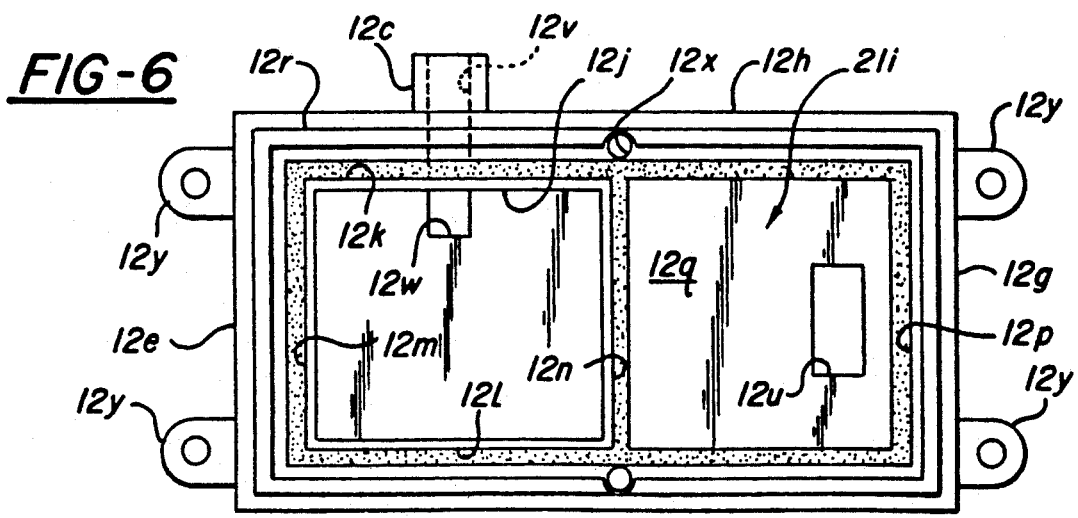
FIG. 6 is a bottom view of an upper housing employed in an invention sensor.
Figure 5:
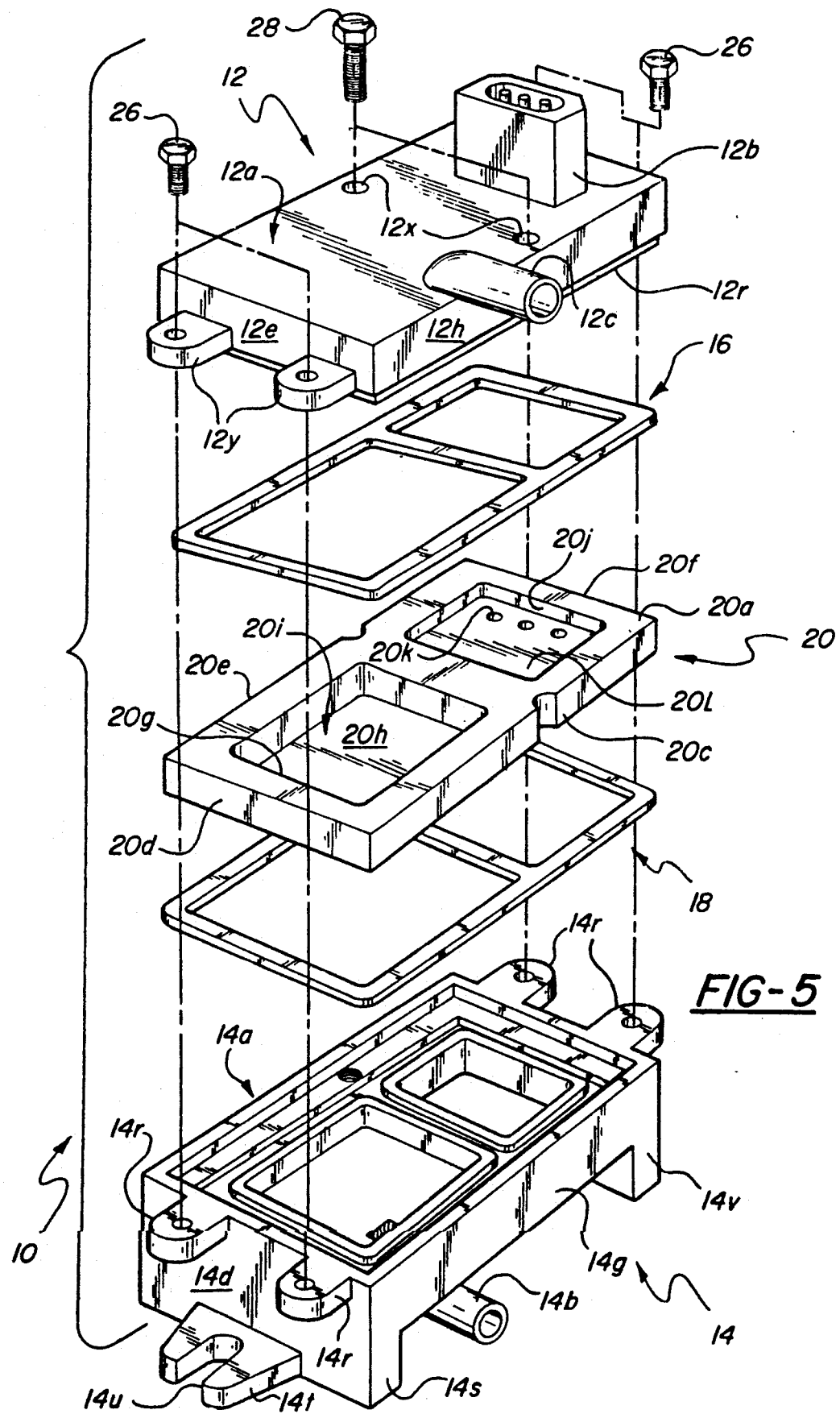
FIG. 5 is an exploded perspective view of the invention sensor.
Figure 7:
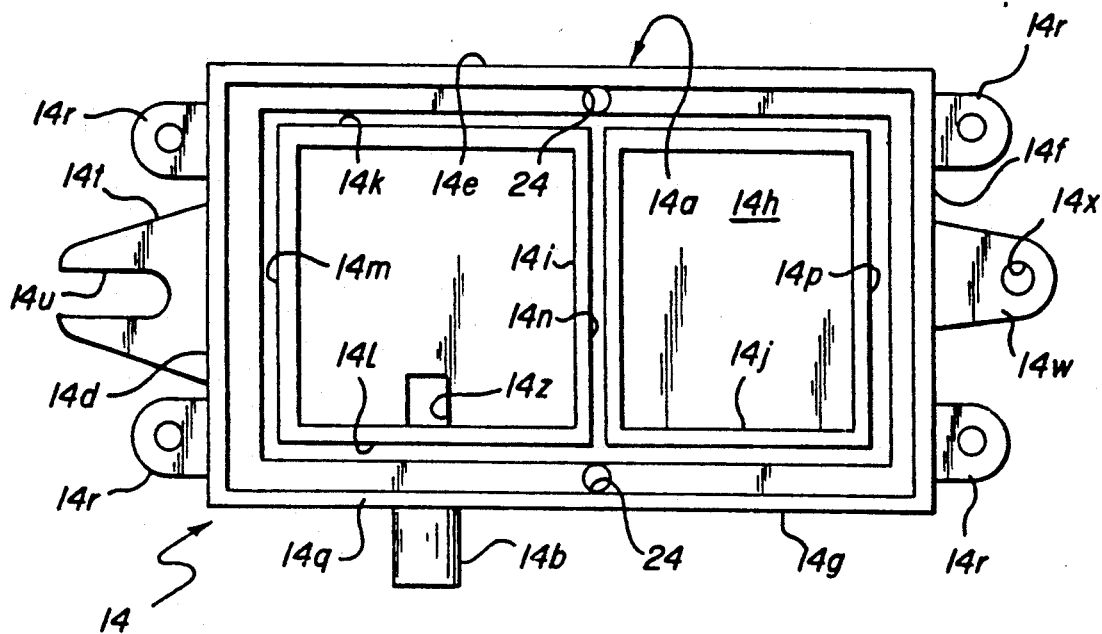
FIG. 7 is a top view of a bottom housing employed in the invention sensor.
Figure 8:
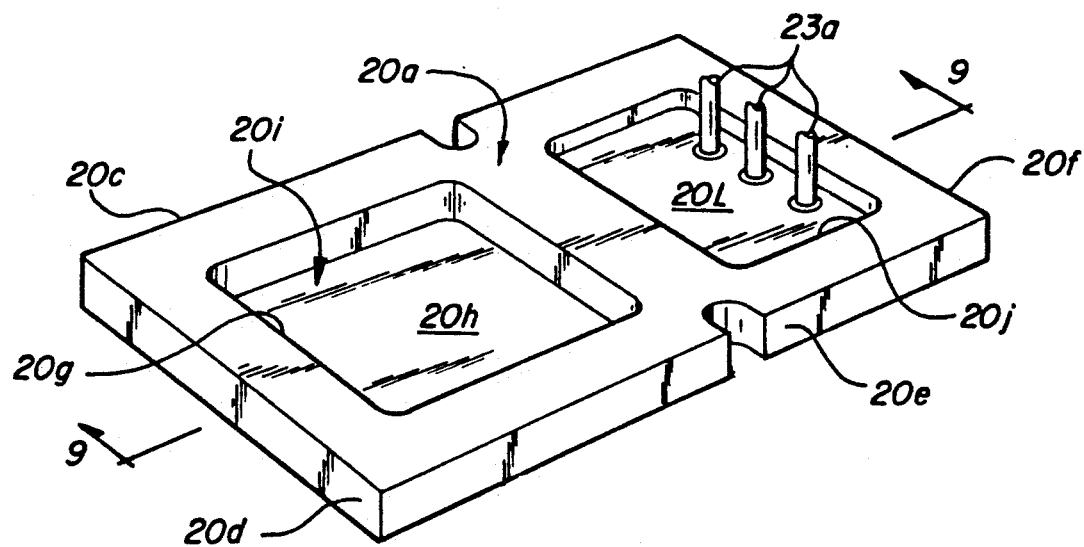
FIG. 8 is a perspective view of a board member employed in the invention sensor.

The invention sensor seen in FIGS. 1-10, broadly considered, includes an upper housing 12, a lower housing 14, an upper seal 16, a lower seal 18, and a board member assembly 20.

Upper housing 12 is formed of a suitable material such, for example as aluminum or a suitable plastic, and includes a main body portion 12a, an upstanding socket or receptacle portion 12b, and a conduit or tube portion 12c. Main body portion 12a includes an upper generally planar surface 12d, side edges 12e, 12f, 12g and 12h, and a lower surface generally indicated at 12i. Lower face 12i includes a rectangular downwardly opening cavity 12j and a seal groove including longitudinal portions 12j and 12l connected by transverse portions 12m, 12n and 12p. Seal portions 12k, 12l, 12m and 12n coact to define a generally rectangular groove configuration surrounding rectangular cavity 12j and seal portions 12k, 12l, 12n and 12p coact to define a generally rectangular groove configuration surrounding a rectangular area 12q forming a portion of the lower surface 12i of the upper housing. A downwardly extending flange 12r extends around the perimeter of the lower surface 12i of the upper housing in surrounding relation to the seal groove and in surrounding relation to cavity 12j and area 12q.

Socket portion 12b upstands from upper surface 12d proximate side edge 12g of the housing and defines a cavity 12s which terminates in a lower wall 12t in which is formed a rectangular opening 12u opening at its lower end in the area 12q on the lower face 12i of the housing.

Tube portion 12c upstands from upper surface 12d proximate side edge 12h and in transverse alignment with cavity 12j and defines a central passage 12v which opens in cavity 12j at 12w.

Upper housing 12 further includes bores 12x extending through the housing and spaced lugs 12y at the opposite ends of the housing.

Lower housing 14 is also formed of a material such as aluminum or plastic and includes a main body portion 14a and a conduit or tube portion 14b.

Main body portion 14a includes a lower generally planar surface 14c, side edges 14d, 14e, 14f, and 14g, and an upper surface indicated generally at 14h. Upper surface 14h defines a relatively shallow rectangular cavity 14i corresponding in size and configuration to the cavity 12j in the lower surface of the upper housing, a relatively deep rectangular cavity 14j, and a seal groove including longitudinal groove portions 14k, 14l, 14n, and 14p. Seal portions 14k, 14l, 14m, and 14n are disposed in surrounding relation to cavity 14i and seal portions 14l, 14m, 14n, l and 14p are disposed in surrounding relation to cavity 14h. Cavity 14j will be seen to correspond in size and configuration to the area 12q on the lower surface of the upper housing. The main body portion of the lower housing an upwardly extending flange portion 14q further includes an upwardly extending flange portion 14q extending around the periphery of the upper face of the housing, spaced lug pairs 14r at either end of the housing, a flange portion 14s at one end of the housing terminating in a mounting flange 14t defining a U-shaped mounting opening 14u, and a mounting flange 14v at the other end of the housing terminating in a mounting flange 14w defining a mounting hole 14x.

Conduit or tube portion 14b downstands from lower surface 14c proximate side edge 14g and in transverse alignment with cavity 14i and defines a central passage 14y opening at 14z in the lower face of cavity 14i.

Upper and lower seals 16 and 18 are identical, are formed, for example, of silicone, and are sized and configured to seat respectively in groove 12k–12p in the lower surface of the upper housing 12 and in groove 14k–14p in the upper surface of the lower housing 14.

Board member 20 is formed of a suitable dielectric material such as alumina and has a generally block-like rectangular configuration defined by an upper surface 20a, a lower surface 20b, and side edges 20c, 20d, 20e, and 20f. A generally rectangular cavity 20g is formed in the upper surface 20a of the board member corresponding in size and configuration to cavities 12j and 14j formed respectively in the upper and lower housings. Cavity 20g has a depth relative to the total thickness of the board member such that the lower face 20h of the cavity coacts with the lower surface 20b of the board member to define a relatively thin flexible diaphragm portion 20i of the board member of generally rectangular configuration corresponding in size and configuration to the cavities 12j, 20g and 14j.

A further cavity 20j is formed in the upper surface 20a of the board member. Cavity 20j has a size and configuration generally corresponding to the size and configuration of the cavity 14j in the lower housing and includes three spaced bores or openings 20k. Cavity 20j is significantly shallower than cavity 20g so that the lower surface 20l of cavity 20j coacts with the lower surface 20b of the board member to define a relatively thick mounting portion 20m through which the bores 20k extend.

Board member 20 will thus be seen to comprise a relatively thin diaphragm portion 20h and a relatively thick substrate portion comprising the mounting portion 20m and the annular board portions surrounding the diaphragm portion 20i and the mounting portion 20m.

In the assembled relation of the sensor, the board member 20 is clamped around its perimeter between upper housing 12 and lower housing 14 with the flange 14n on the lower housing telescopically receiving the flange 12r on the upper housing and with the housings coacting to define a pressure chamber 21 constituted by cavities 12j and 14i and an instrumentation chamber 22 defined between the lower face of cavity 14j and area 12q on the lower face of the upper housing; the outer perimeter of the board member is seated snugly within the inner perimeter defined by flange 12r; the diaphragm portion 20i of the board member extends across the pressure chamber 21 to divide the pressure chamber 21 into an upper pressure chamber portion 21a above the diaphragm portion and a lower pressure chamber portion 21b below the diaphragm portion; a plurality of connector pins or terminals 23 are positioned in spaced relation within the cavity 12s of socket portion 12b of the upper housing and extend downwardly through a suitable insulating material 24 positioned within cavity 12s and pass at their lower ends 23a through opening 12u and through a respective bore 20k in the mounting portion 20m of the board member to position their respective lower tips 23b, 23c, and 23d in proximity to the planar underface 20b of the board member; upper and lower seals 16 and 18 are sealed in their respective grooves and respectively engage the upper and lower faces of the board member to sealingly isolate the board member from the exterior of the sensor and to sealingly isolate pressure chamber 21 from instrumentation chamber 22; bolts 26 pass downwardly through holes in lugs 12y for threaded engagement with threaded bores in lugs 14r to maintain the upper and lower housings in tightly coupled relation with the board member clamped therebetween; and further bolts 28 extend downwardly through holes 12z in the upper housing member for threaded engagement with threaded bores 24 in the lower housing 14 to supplement the clamping action of the bolts 26.

It will be understood that, in use, the sensor is suitably secured to a support surface utilizing flange U opening 14u and flange mounting hole 14x and hoses 30 and 32 are respectively fitted over tube portions 12c and 14b of the respective housings to communicate the gas or fluid pressures in hoses 30 and 32 respectively with the upper and lower faces of the diaphragm portion of the board member so as to produce selected deflection of the diaphragm portion in proportion to the pressure differential between the fluid pressures in upper and lower pressure chamber portions 21a and 21b as transmitted by hoses 30 and 32.

As best seen in FIG. 10, the lower planar surface 20b of member 20 is provided with a strain gauge circuit assembly including a resistive strain gauge assembly 34 and a conditioning circuit 36. Specifically, strain gauge assembly 34 is provided on planar surface 20b in underlying relation to diaphragm portion 20i and conditioning circuit 36 is provided on planar surface 20b in underlying relation to mounting portion 20m.

Strain gauge assembly 34 includes strain gauges R1, R2, R3 and R4 which are distributed over the area of diaphragm portion 20i in a manner such that, with a given deflection of the diaphragm portion, certain of the gauges experience elongation and certain of the gauges experience compression. Specifically, strain gauges R1 and R4, by virtue of their positions proximate the perimeter of the diaphragm portion, will experience compression in response to upward deflection of the diaphragm portion and elongation in response to downward deflection of the diaphragm portion and strain gauges R2 and R3, by virtue of their positions proximate the central region of the diaphragm portion, will experience corresponding elongation in response to upward deflection of the diaphragm portion and corresponding compression in response to downward deflection of the diaphragm portion.

The terminals provided by the lower ends 23b, 23c, and 23d of the connector pins 23 comprise a central common ground terminal 23c flanked by positive terminals 23b and 23d. Ground terminal 23c and positive terminal 23b coact to provide an input voltage to the strain gauge assembly via leads 38 and 40. The strain gauges will be seen to be arranged in a well-known Wheatstone Bridge configuration with an output lead 42 transmitting the output voltage of the strain gauge assembly to conditioning circuit 36. Conditioning circuit 36 will be understood to include various circuit elements to modulate the output signal of the strain gauge assembly. Circuit 36 may include, for example, printed resistors for adjusting and balancing the circuit and for temperature compensation; discrete IC amplifiers to amplify the strain gauge output; discrete diodes for temperature compensation; and discrete capacitors for filtering out unwanted high response noise. The conditioned output signal is thereafter transmitted to the positive terminal 23b via a lead 44 so that, with a suitable power plug 40 plugged into socket 12b for coaction with the connector pins 23, and in response to the generation of a differential pressure across the diaphragm portion 20i of the board member, an output voltage appears across the ground terminal 23c and positive terminal 23b which is proportional to the differential in pressure being experienced by the diaphragm portion.

Figure 12:
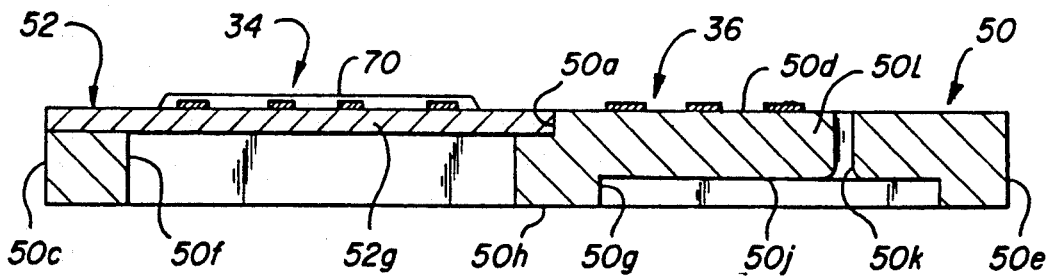
FIG. 12 is a cross-sectional view taken on line 12—12 of FIG. 11.

In the embodiment of the invention seen in FIGS. 11 and 12, the board member (shown inverted in the FIGURES) is formed as a board member assembly including a primary board member 50 and a supplemental board member 52. The lower (upper in the FIGURES) surface of primary board member 50 defines a transverse shoulder 50a having a height or thickness corresponding to the thickness of the supplemental board member 52. Shoulder 50a divides the lower surface of the primary board member into a first surface portion 50b defined between shoulder 50a and end edge 50c of the primary board member and a second surface portion 50d defined between shoulder 50a and board member end edge 50e.

A circular through hole 50f is provided centrally of surface portion 50b and a rectangular cavity 50g is defined in the upper surface 50h of the primary board member. A board member mounting portion 50i is defined between the lower surface 50j of cavity 50g and board member surface 50d. Supplemental board member 52 is suitably secured to surface portion 50b of the primary board member so that the lower face 52a of the supplemental board member is flush with surface portion 50d of the primary board member and so that the portion of supplemental board member 52 extending across hole 50f constitutes a thin diaphragm portion 52g of the board assembly and the remainder of the board member assembly constitutes a substrate portion.

Strain gauge assembly 34 is provided on the lower surface of the diaphragm portion 52g and the remainder of the strain gauge circuit assembly, including the conditioning circuit 36 and the various leads extending from the terminals, is provided on the surface portion 50d of the primary board member. Following the securement of the supplemental board member 52 to the primary board member 50, the leads 38a, 40a, and 42a on the supplemental board member are respectively connected, by soldering or the like, to the leads 38b, 40b, and 42b on the primary board member surface portion 50d to complete the circuity. In the assembled relation of the board member assembly of FIGS. 11 and 12 in the sensor housing, the lower ends 23a of the pin connectors 23 pass downwardly through holes 50k in the primary board member for connection into the circuitry.

Figure 13:
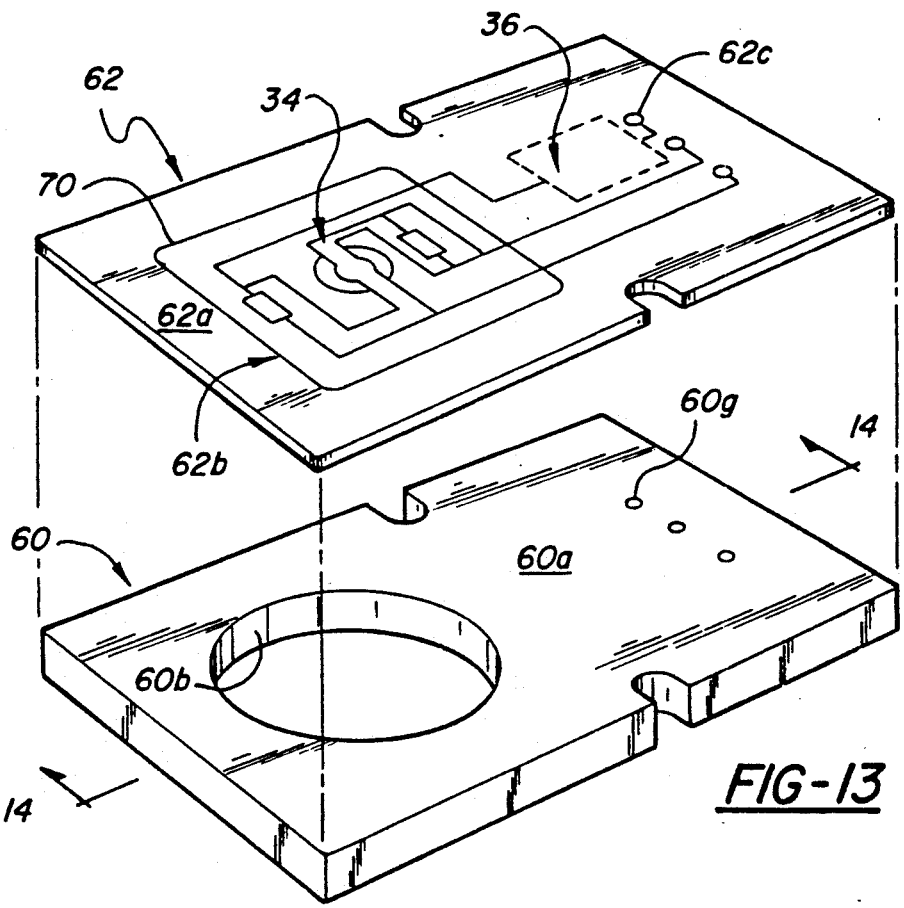
FIG. 13 is an exploded perspective view of a further modified form of the invention board member.
Figure 14:
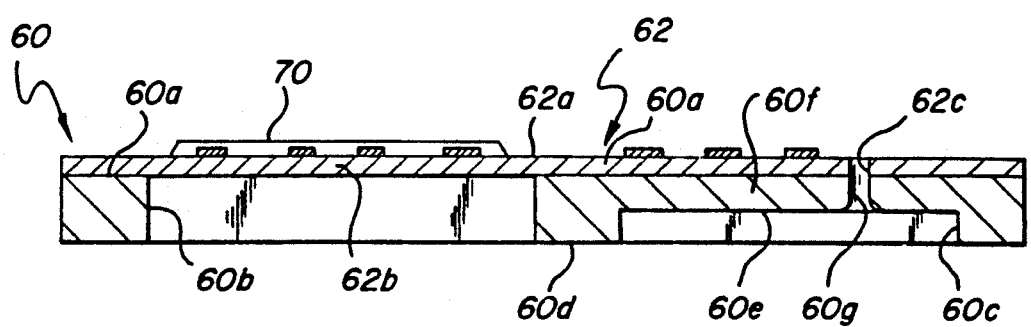
FIG. 14 is a cross-sectional view taken on line 14—14 of FIG. 13.

In the embodiment of the invention seen in FIGS. 13 and 14, the board member (shown inverted in the Figures) is formed as a board member assembly including a primary board member 60 and supplemental board member 62 suitably secured to the lower face 60a of the primary board member. Supplemental board member 62 has a size and configuration corresponding to the size and configuration of the primary board member 60 and the entire circuitry of the strain gauge circuit assembly is provided on the lower face 62a of the supplemental board member.

Primary board member 60 includes a through hole or aperture 60b; the diaphragm portion of the board member assembly is defined by the portion 62b of supplemental board member 62 extending across aperture 60b; a rectangular cavity 60c is defined in the upper surface 60d of the primary board member; the lower surface 60e of cavity 60c coacts with the lower surface 60a of the primary board member to define a mounting portion 60f; strain gauge assembly 34 is provided on the lower face of diaphragm portion 62b; and the remaining circuitry is provided on the lower face 62a of the supplemental board member proximate mounting portion 60f of the primary board member.

With supplemental board member 62 secured to the lower face 60b of board member 60, pin apertures 62c in the supplemental board member 62 align with pin apertures 60g in the primary board member 60 to allow passage of the lower ends 23a of the connector pins 23 through apertures 60g and 62c for connection into the circuitry on the lower face 62a of the board member assembly in the manner previously described with reference to the FIGS. 1-10 embodiment.

Figure 15:
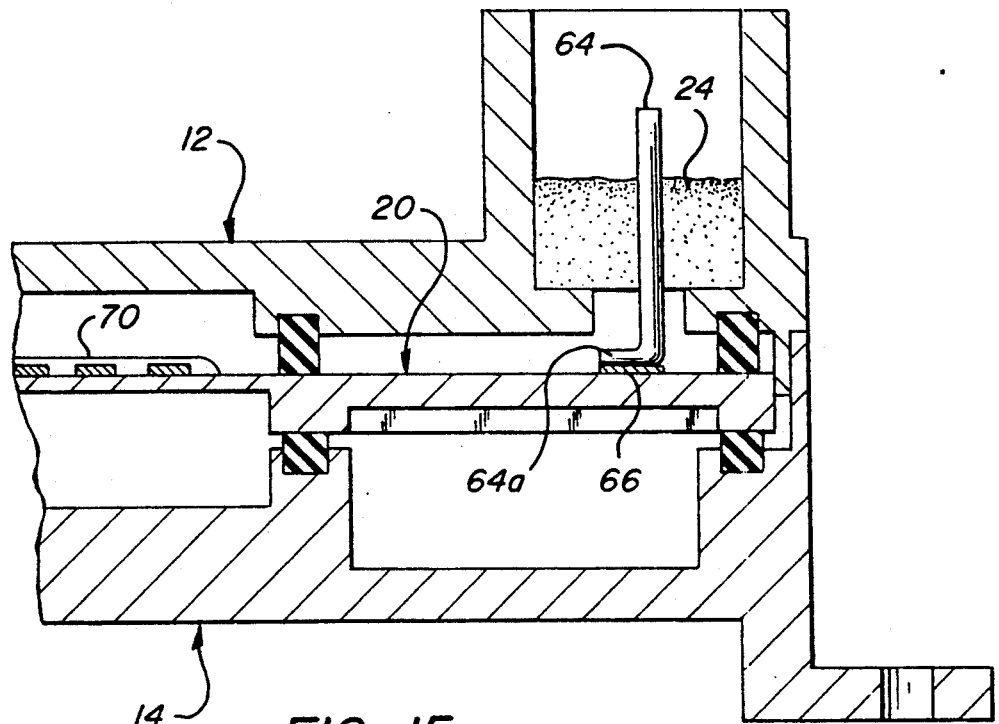
FIG. 15 is a fragmentary view of a further modified form of the invention.
Figure 16:
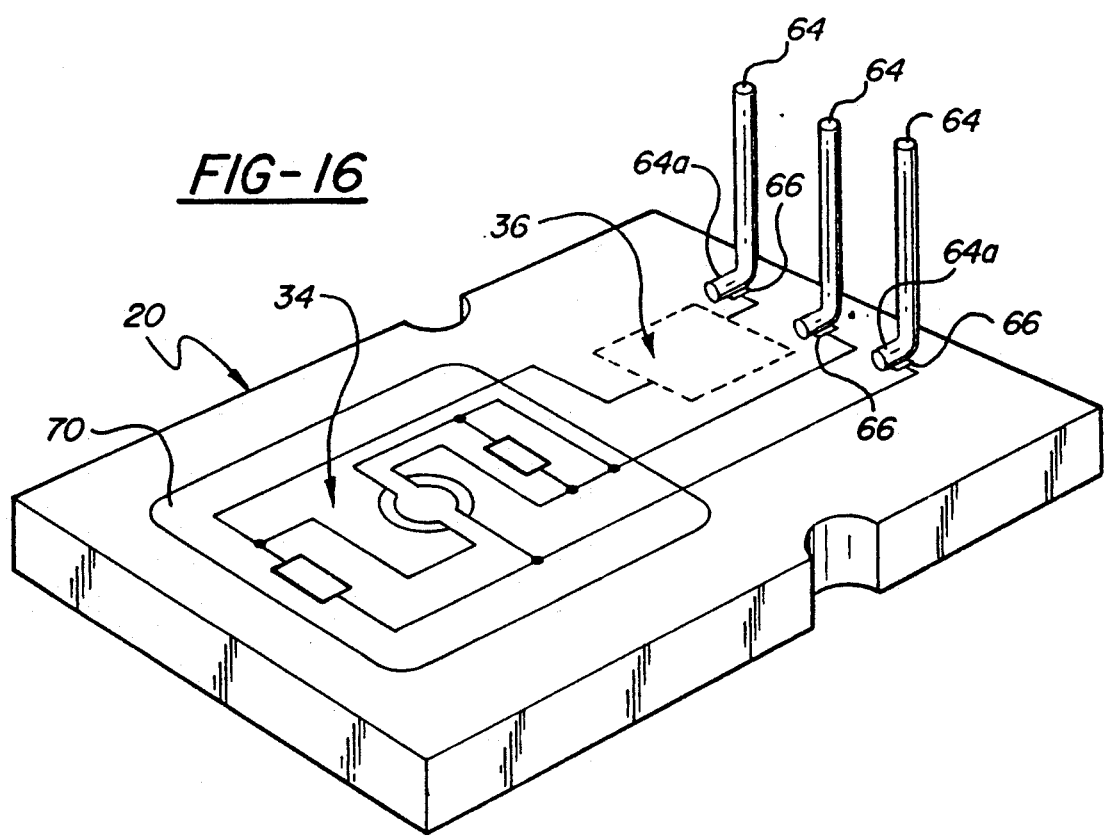
FIG. 16 is a fragmentary perspective view of the modified form of the invention seen in FIG. 15.

The sensor seen in FIGS. 15 and 16 is identical to the sensor shown in the FIGS. 1-10 embodiment with the exception that the connector pins or terminal 23 of the FIGS. 1-10 embodiment are replaced by connector pins or terminals 64 which, rather than passing at their lower ends through apertures in the board member, instead terminate at their lower ends in bent terminal portions 64a which are cemented to the upper face of the board member by a suitable conductive heat epoxy paste 66. The board member 20 in this embodiment is rotated 180° with respect to the board member disposition in the FIGS. 1-10 embodiment so that the strain gauge circuit assembly, including the resistive strain gauge assembly 34 and the conditioning circuit 35, are positioned on the upper face of the board with the terminal portions of the circuit assembly connected in known manner to the respective lower bent portions 64a of the respective pins 64.

In all of the embodiments, the circuitry on the board member assembly, with the exception of the discrete circuit components, is preferably provided in a thick film screen printing operation in which suitable material is screen printed onto the lower planar face of the board member assembly to provide the various elements of the circuitry. The screen printing is preferably carried out in a multi-step process in which first the conductors are printed utilizing gold, platinum or silver material, then the resistors (other than the strain gauge resistors) are printed utilizing suitable resistive material, and then the strain gauge resistors are printed utilizing a suitable thick film resistor material.

After the screen printing has been completed, a layer or thick film 70 of a dielectric glass material is suitably applied at least over the strain gauge assembly 34 as a protective coating for the strain gauge assembly. Coating 70 hermetically seals the strain gauge elements to insulate the strain gauge elements from the media whose pressure is being measured and to encapsulate the strain gauge elements in a common material to ensure a consistent coefficient of thermoexpansion throughout the strain gauge.

The invention will be seen to provide an extremely simple and extremely inexpensive resistive strain gauge sensor wherein the required circuitry is totally provided on a single planar surface of a single board member, so as to simplify the fabrication of the circuitry and so as to substantially eliminate the use of solder or other joints in the circuitry, and wherein the transmittal of power to and from the circuitry is simplified and optimized.

Whereas preferred embodiments of the invention have been illustrated and described in detail, it will be apparent that various changes may be made in the disclosed embodiments without departing from the scope or spirit of the invention.

We claim:

1. A transducer comprising:
   a housing defining a pressure chamber and an instrument chamber;
   a board member having first and second opposite side faces and including a mounting portion extending across the instrument chamber and a diaphragm portion extending across the pressure chamber;
   a strain gauge circuit assembly on said first side face of the board member within the housing and including a strain gauge assembly positioned on said diaphragm portion; and
   a plurality of pin members extending from a location accessible from the exterior of the housing and through the mounting portion of the board member from said second side face to said first side face for connection at said first side face with the circuit assembly.

2. A transducer according to claim 1 wherein the pin members define terminal means at their terminal ends for connection with the circuit assembly.

3. A transducer according to claim 2 wherein the housing includes an upwardly opening socket, said first side face comprises a lower face of the board member, and the pins are positioned at their upper ends in the socket and extend downwardly for passage at their lower ends through the board member to define said terminal means at their lower ends.

4. A strain gauge pressure sensor including a housing defining a pressure chamber and an instrument chamber, a board member including a diaphragm portion extending across the pressure chamber and a mounting portion extending across the instrument chamber and secured at one side edge thereof to said housing, a strain gauge circuit assembly on one face of the board member, and electrical connector means connected to said circuit assembly, characterized in that the electrical connector means comprises a plurality of pin members extending from a location accessible from the exterior of the housing and through the mounting portion of the board member at a location between said one side edge and said diaphragm portion for connection at said one side face of said board member with the circuit assembly.

5. A strain gauge pressure sensor according to claim 4 wherein the housing includes an upwardly opening socket, the circuit assembly is provided on a lower face of the board member, and the pins are positioned at their upper ends in the socket and extend downwardly for passage at their lower ends through the board member to define terminal means at their lower ends for connection with the circuit assembly.

6. A differential pressure sensor including a housing defining a pressure chamber, a diaphragm extending across the chamber to divide the chamber into an upper chamber portion in communication with a first fluid pressure and a lower chamber portion in communication with a second fluid pressure, and a resistive strain gauge assembly positioned on the diaphragm and operative in response to flexing of the diaphragm to generate an output signal proportional to the pressure differential between the upper and lower chamber portions; characterized in that the housing further defines an instrumentation chamber laterally displaced from the pressure chamber; the sensor includes a board member extending laterally within the housing and including a relatively thin diaphragm portion constituting the diaphragm of the sensor and a relatively thick substrate portion extending across the instrumentation chamber; the strain gauge assembly is positioned on the diaphragm portion within the pressure chamber; the sensor further includes a conditioning circuit positioned on the substrate portion within the instrumentation chamber and electrically connected to the output of the strain gauge assembly; the sensor further includes terminal means positioned on the substrate portion within the instrumentation chamber and electrically connected respectively to the input of the strain gauge assembly and the output of the conditioning circuit; the strain gauge assembly, the conditioning circuit and the terminal means are provided on one surface of the board member, and the terminal means are provided by connector pins extending from a location exteriorly of the housing and connected to said one surface of the board member to define the terminal means at their terminal ends.

7. A pressure sensor according to claim 6 wherein the housing includes an upwardly opening socket; the strain gauge assembly, conditioning circuit, and terminal means are provided on the lower face of the board member; and the pins are positioned at their upper ends in the socket and extend downwardly for passage at their lower ends through the board member to define the terminal means at their lower ends.

* * * * *